United States Patent [19]

Altrieth, III et al.

[11] Patent Number: 5,642,185
[45] Date of Patent: Jun. 24, 1997

[54] AUTOMATIC TERMINATION OF SCREEN SAVER MODE ON A DISPLAY OF REPRODUCTION APPARATUS

[75] Inventors: Frederick E. Altrieth, III, Scottsville, N.Y.; Valerie J. Snyder, Boca Raton, Fla.

[73] Assignee: Eastman Kodak Company, Rochester, N.Y.

[21] Appl. No.: 399,866

[22] Filed: Mar. 7, 1995

[51] Int. Cl.$^6$ .................................................. G03G 15/00
[52] U.S. Cl. ........................... 399/81; 345/212; 364/707
[58] Field of Search ............................... 355/204, 209, 355/206; 345/173, 211, 212; 364/707; 371/16.4

[56] References Cited

U.S. PATENT DOCUMENTS

| | | | |
|---|---|---|---|
| 4,740,818 | 4/1988 | Tsilibes et al. | 355/239 |
| 4,745,436 | 5/1988 | Matsuura | 355/206 |
| 4,825,209 | 4/1989 | Sasaki et al. | 340/825.72 |
| 4,870,526 | 9/1989 | Maruta et al. | 355/206 X |
| 5,010,551 | 4/1991 | Goldsmith et al. | 371/16.4 |
| 5,045,880 | 9/1991 | Evanitsky et al. | 355/200 |
| 5,049,931 | 9/1991 | Knodt | 355/209 |
| 5,059,961 | 10/1991 | Cheng | 345/10 |
| 5,061,958 | 10/1991 | Bunker et al. | 355/209 |
| 5,065,357 | 11/1991 | Shiraishi et al. | 395/200 |
| 5,105,220 | 4/1992 | Knodt et al. | 355/209 |
| 5,113,222 | 5/1992 | Wilson et al. | 355/209 |
| 5,365,310 | 11/1994 | Jenkins et al. | 355/204 X |
| 5,396,443 | 3/1995 | Mese et al. | 364/707 |

FOREIGN PATENT DOCUMENTS 01-284886  11/1989  Japan.

*Primary Examiner*—Arthur T. Grimley
*Assistant Examiner*—Sophia S. Chen
*Attorney, Agent, or Firm*—William F. Noval

[57] ABSTRACT

A reproduction apparatus having a control system which includes a plurality of hard buttons and switches for providing operator input to and control of said reproduction apparatus, a display for displaying selectable features for a reproduction run and for displaying alphanumeric and graphical information, and a touchscreen overlaying at least a part of the display and having soft buttons and areas for providing operator input to the reproduction apparatus. A method of providing control of the display includes the steps of:

operating the display in a screen saver mode when the control system determines that there has been no reproduction apparatus activity for a preselected time; and
terminating said screen saver mode of the display when the control system determines one of the following events has occurred;
a) the touchscreen has been touched;
b) a hard button has been actuated; and
c) reproduction apparatus activity other than that of a) or b) has been determined.

The reproduction apparatus activity of substep c) can be detection of a new error in said reproduction apparatus, a document sensor or a copy sheet sensor has changed, or an interlock state has changed.

4 Claims, 6 Drawing Sheets

FIG. 4

Energy Saving

Screen Saver
(5 – 60 minutes) [25]

Conservation Mode (Same time as Screen Saver)

Automatic Power Down
After no activity [120]
(5 – 120 minutes)

Automatic Power Down
Specific time [05] [00] pm
[+] [−]

MACHINE SETUP   Key Operator   9:07 am   2/27/95

AUTOMATIC TERMINATION OF SCREEN SAVER MODE ON A DISPLAY OF REPRODUCTION APPARATUS

FIELD OF THE INVENTION

The present invention relates, in general, to reproduction apparatus, and relates, more specifically, to electrographic reproduction apparatus having multiple ways of automatically terminating a screen saver mode of a display of the apparatus.

BACKGROUND OF THE INVENTION

Electrographic reproduction apparatus are provided with an operator control panel for allowing an operator to program the apparatus for a reproduction run. In its simplest form, the control panel includes several dedicated (hard) buttons and switches for selecting features for a reproduction run, as well as visual indicators for informing the operator which features were selected. The operator control panel can also have a display for displaying alphanumeric and graphical information. The control panel also includes keys and buttons for altering the display to indicate selected options. (See, for example, U.S. Pat. No. 5,113,222, issued May 12, 1992, to Wilson et al.) The display may also include a touchscreen overlay having "soft buttons" for providing operator input to the reproduction apparatus. (See, for example, U.S. Pat. No. 5,045,880, issued Sep. 3, 1991 to Evanitsky et al; U.S. Pat. No. 5,061,958, issued Oct. 29, 1991 to Bunker et al.; U.S. Pat. No. 5,105,220, issued Apr. 14, 1992 to Knodt et al.; U.S. Pat. No. 5,049,931, issued Sep. 17, 1991 to Knodt; and U.S. Pat. No. 5,010,551, issued Apr. 23, 1991 to Goldsmith et al.)

The display can have a screen saver mode which is activated after an operator-defined period of inactivity. This mode reduces display (CRT) degradation that occurs when an image remains on a CRT for an extended period of time. Typically, the screen saver mode remains active until an operator presses a button or touches the display. It would be desirable if the screen saver mode were terminated automatically in response to other reproduction apparatus activity, to eliminate the need to press a button or touch the display when preparing to run a copy job, and to immediately display any new messages to the operator.

SUMMARY OF THE INVENTION

According to the present invention, there is provided a solution to the problems of the prior art by providing reproduction apparatus wherein the screen saver mode is terminated automatically as a response to reproduction apparatus activity other than pressing a button or touching the display touchscreen.

According to a feature of the present invention, there is provided in a reproduction apparatus having a control system which includes a plurality of hard buttons and switches for providing operator input to and control of said reproduction apparatus, a display for displaying selectable features for a reproduction run and for displaying alphanumeric and graphical information, and a touchscreen overlaying at least a part of said display and having soft buttons and areas for providing operator input to said reproduction apparatus, the method of providing control of said display comprising the steps of:

operating said display in a screen saver mode when said control system determines that there has been no reproduction apparatus activity for a preselected time; and terminating said screen saver mode of said display when said control system determines one of the following events has occurred;
 a) the touchscreen has been touched;
 b) a hard button has been actuated; and
 c) reproduction apparatus activity other than that of a) or b) has been determined.

The reproduction apparatus activity of substep c) can include detection of a new error in said reproduction apparatus, a document sensor or a copy sheet sensor has changed, or an interlock state has changed.

The method of the invention has the following advantages:

1. Automatic termination of the screen saver mode as a response to other reproduction apparatus activity eliminates the need to actuate a button or switch or touch the touch screen display when preparing to run a copy job. Termination can be initiated by placing an original in the recirculating document feeder, document positioner or continuous forms feeder.

2. Any new messages can be seen immediately if the screen saver mode is terminated because of an interlock change (such as opening the top cover) or because of a reproduction apparatus error detection.

DESCRIPTION OF THE DRAWINGS

FIG. 4 is a screen useful in explaining the present invention.

DETAILED DESCRIPTION OF THE PREFERRED EMBODIMENTS

Because electrographic reproduction apparatus 1 are well-known, the present description will be directed, in particular, to elements forming part of or cooperating more directly with the present invention. Apparatus not specifically shown or described herein are selectable from those known in the prior art. Particular reference is made to U.S. Pat. No. 4,740,818 and U.S. Pat. No. 5,113,222, the contents of which are incorporated herein by reference.

Figure 1:
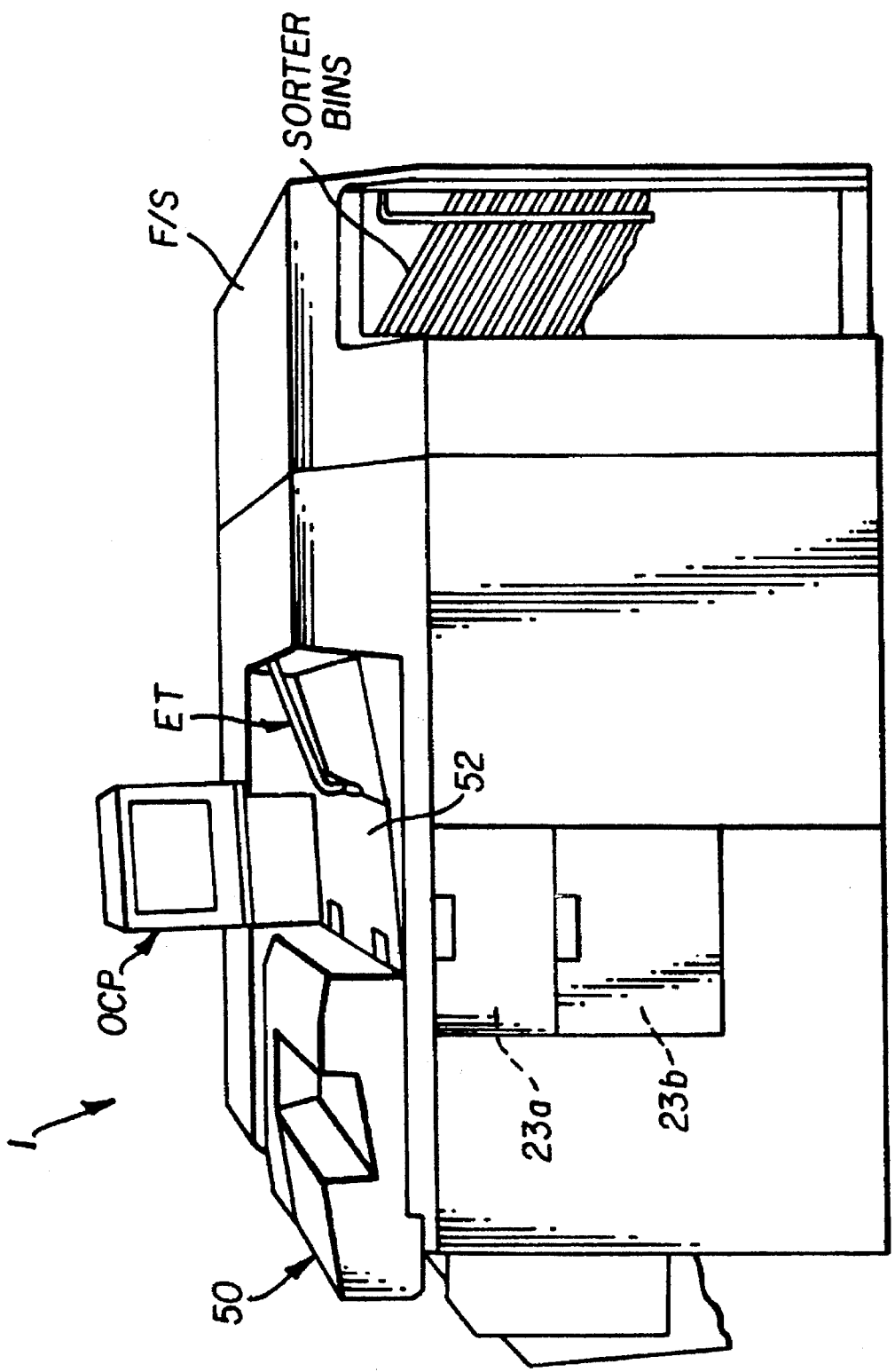
FIG. 1 is a front perspective view of an electrographic reproduction apparatus for incorporating the present invention.

With reference now to FIG. 1, there is shown an electrographic reproduction apparatus 1 having a recirculating document feeder 50 that includes a tray portion for accepting a multi-sheet document original for reproduction. Feeder 50 also includes a document positioner for feeding sheets seriatim from the right over the document platen to the document tray on the left of apparatus 1. A continuous forms feeder can also be provided to feed computer form sheets seriatim to the document platen. The apparatus 1 includes an operator control panel (OCP) which, as will be described, includes buttons and prompting displays for facilitating a job setup, i.e., the input of an instruction set to the apparatus logic and control unit (LCU) to enable it to control a series of operations resulting in a desired copy output representing a reproduction of the document originals. Copies may be produced on receiver sheets stored in either or both drawers holding trays 23a and 23b. The copy output from the apparatus is stored either in an exit tray (ET) or finisher/sorter (F/S) having a series of sorter bins, as is well known.

Figure 2:
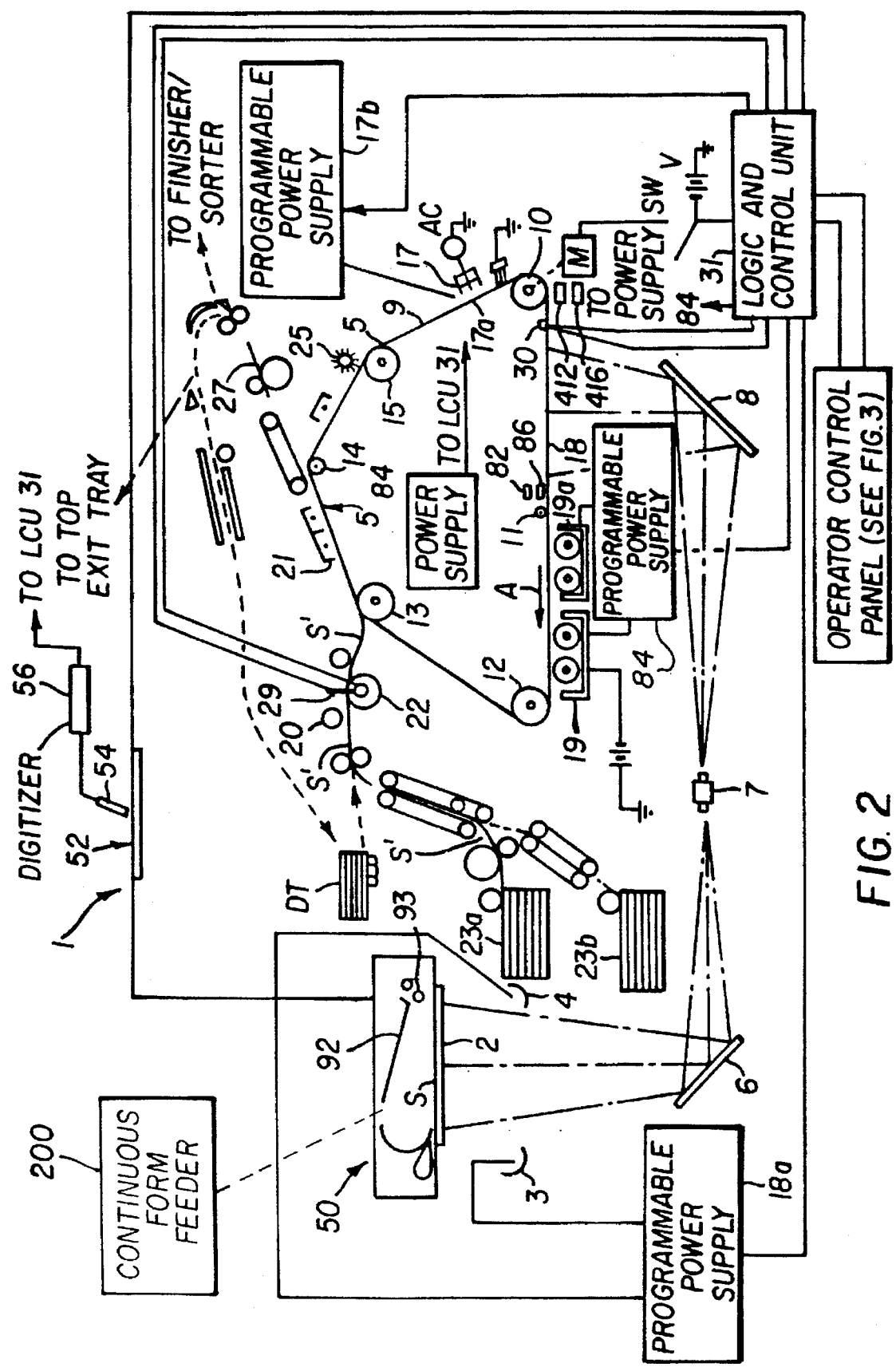
FIG. 2 is a schematic diagram of the electrographic reproduction apparatus of FIG. 1.

Referring now to FIG. 2, the electrographic reproduction apparatus of FIG. 1 incorporating the present invention will be described in greater detail. As shown, reproduction apparatus 1 includes a photoconductive web 5 that is trained about six transport rollers 10, 11, 12, 13, 14 and 15, thereby forming an endless or continuous web. Roller 10 is coupled to a drive motor M in a conventional manner. Motor M is connected to a source of potential V when a switch SW is closed by a control system such as logic and control unit (LCU) 31. When the switch SW is closed, the roller 10 is driven by the motor M and moves the web 5 in clockwise direction as indicated by arrow A. This movement causes successive image areas of web 5 to sequentially pass a series of work stations of the apparatus 1. These workstations include: a charging station 17,17a at which the photoconductive surface 9 of the web 5 is sensitized by applying to such surface a uniform electrostatic charge of a predetermined voltage; an exposure station 18 at which a light image of a document sheet S, supported on transparent platen 2, is projected by mirrors 6, 8 and lens 7 onto the photoconductive surface 9 of the web 5 to produce a latent electrostatic image of the document sheet. Document sheet S can be provided by recirculating feeder 50 with feed rollers 93, a document positioner, or continuous form feeder 300. Also included are a magnetic brush development station 19 at which the latent image is developed with developer which may consist of iron carrier particles and electroscopic toner particles with an electrostatic charge opposite to that of the latent electrostatic image, to form a toner image on web 5. A transfer station, including a corona charger 21 transfers the toner image on web 5 to a copy sheet S' which is transported to a heated pressure roller fuser 27 where the toner image is fixed to copy sheet S'. The sheet S' containing a fixed toner image is fed to a finisher/sorter or a top exit tray. Apparatus 1 also includes exposure lights 3,4, programmable power supplies 17b, 18a, and 84, tray 92 of feeder 50, web sensor 30, tachometers 412, 416, and sensors 82,86.

A cleaning station 25 is provided to clean the photoconductive surface 9 of web 5 of any residual toner particles remaining after the toner images have been transferred.

Copy sheet S' is fed from one of supplies 23a or 23b to continuously driven rollers 20 which urge sheet S' against a rotating registration finger 29 of a copy sheet registration mechanism 22, from which it is fed to the transfer station 21.

Apparatus 1 includes an additional color development station 19a, a duplex tray DT and a digitizer, including digitizer tablet 52, wand 54 and circuit 56 which provide digital signals to LCU 31.

Figure 3:
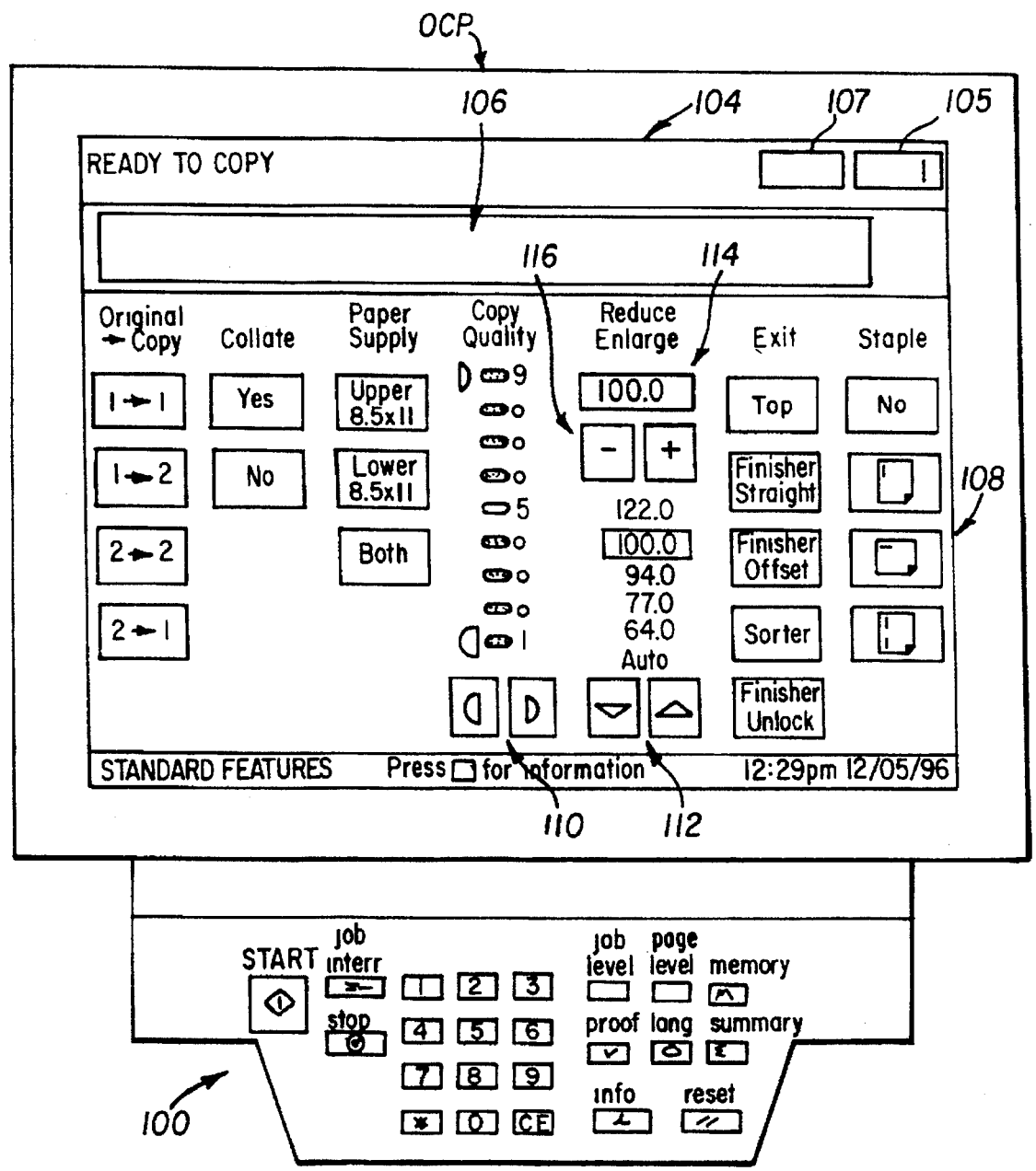
FIG. 3 is a diagrammatic view of an operator control panel, including a display with a touchscreen.

Referring now to FIG. 3, there is shown an operator control panel (OCP) which includes a set 100 of dedicated "hard" buttons and switches and a touchscreen display 104 to allow operator input and control of apparatus 1. The touchscreen display 104 includes (1) a known programmable type display wherein LCU 31 includes a computer program and a bit map memory for controlling the representation that is visible on the display and (2) a touchscreen which overlays at least a part of the display. The touchscreen is an operator input device having operator actuable "soft" buttons and areas for providing operator input to the reproduction apparatus. Touchscreens are well known and include resistive, acoustic, and infrared type input technologies. Alphanumeric and graphical information can be displayed on the display.

The operator selectable set of hard buttons on the left include, START, JOB INTERRUPT, and STOP buttons. In the middle are numerical buttons 0–9 to set the number of copies or sets to be copied. A * and CE (clear entry) buttons are also included. On the right are the following hard buttons; JOB LEVEL, PAGE LEVEL, MEMORY, PROOF, LANGUAGE, SUMMARY, INFORMATION and RESET. The INFORMATION (i) button accesses an information system (stored in memory in LCU 31) which provides detailed information about reproduction apparatus 1 including features selectable by the operator and messages which are displayed on touchscreen display 104.

As shown in FIG. 3, the screen illustrated on the touchscreen display is referred to as the "standard features" screen as it displays various features that a casual user of the apparatus 1 would want when first approaching the apparatus for an average reproduction run. The screen includes a message display area 106, a copies or sets requested display area 105, a copies or sets completed display area 107, and a "soft" button area 108. The "soft" button area includes selectable features with plural displayed options for each feature. The features shown are original copy, collate, paper supply, copy quality, reduce/enlarge, exit, staple. The plural selected options for each feature are provided with operator actuable soft buttons overlaying the displayed feature options. The selected feature option is highlighted.

The copy quality and reduce/enlarge features are provided with respective scroll buttons 110,112 for scrolling through the feature options. The feature options are sequentially highlighted during scrolling. The reduce/enlarge feature also includes a zoom option 114 with scroll buttons 116.

Certain feature options may also be locked out to the operator, although displayed. Such feature option (e.g., the "finisher unlock" option under the "exit" feature shown in FIG. 3) is highlighted in a different manner than highlighted feature options.

According to the present invention, there is provided a method of providing control of the display of reproduction apparatus 1. After an operator-defined period of inactivity of apparatus 1, a screen saver mode is activated by control system LCU 31. This mode reduces the CRT display degradation that occurs when an image remains on a CRT for an extended period of time. The screen saver mode can be effected by blanking the display or by a changing graphical presentation on the display.

Typically, the screen saver mode remains active until an operator actuates a hard button or switch or touches the touch screen display. According to the present invention, other reproduction apparatus activity will initiate automatic termination of the screen saver mode.

Referring now to FIG. 4, the touchscreen display 104 is shown displaying a "Energy Saving" touch screen. The energy saving features include "Screen Saver", "Conservation Mode", "Automatic Power Down—After No Activity", and "Automatic Power Down—Specific Time". By touching the "light bulb" soft button adjacent to the "Screen Saver" line, the operator can set the time period of inactivity before the screen save is activated. As shown, the time period range is 5–60 minutes, the time period displayed is 25 minutes, and operator actuation of the "–" and "+" soft buttons decreases or increases the time period from the time period displayed.

Figure 5:
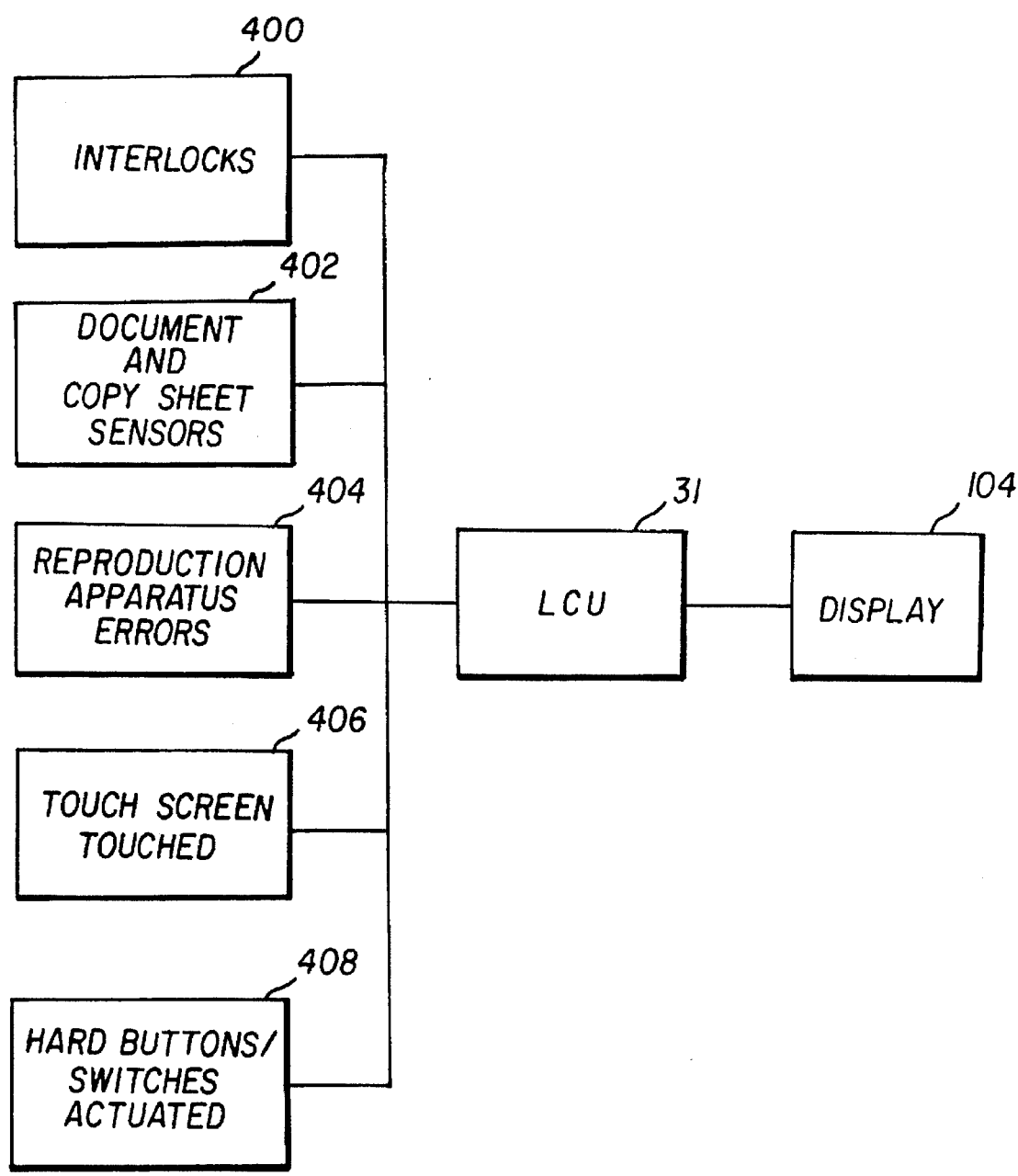
FIGS. 5 and 6 are, respectively, a block diagram and a flow diagram, useful in explaining the method of the present invention.

The method of the invention will be explained in greater detail with reference to FIGS. 5 and 6. As shown in FIG. 5, several activities of reproduction apparatus 1 can initiate termination of the screen saver mode on display 104. Reproduction apparatus 1 has several interlock switches associated with covers, doors and mechanisms (Box 400), which, when changed, produce a signal sent to LCU 31 to initiate screen saver mode termination. Similarly, reproduction apparatus 1 has document sensors (Box 402) in recirculating document feeder 50, the document positioner, the continuous form feeder 300, as well as copy sheet sensors, such as in copy sheet trays 23a and 23b, which, when changed, produce a screen saver mode termination signal sent to LCU 31. Errors (Box 404) in reproduction apparatus 1 can also produce screen saver mode termination signals sent to LCU 31. Touching touch screen 104 (Box 406) or a hard button or switch (such as START, STOP or RESET buttons—FIG. 3) (Box 408) also initiates termination of the screen saver mode through signals sent to LCU 31.

Figure 6:
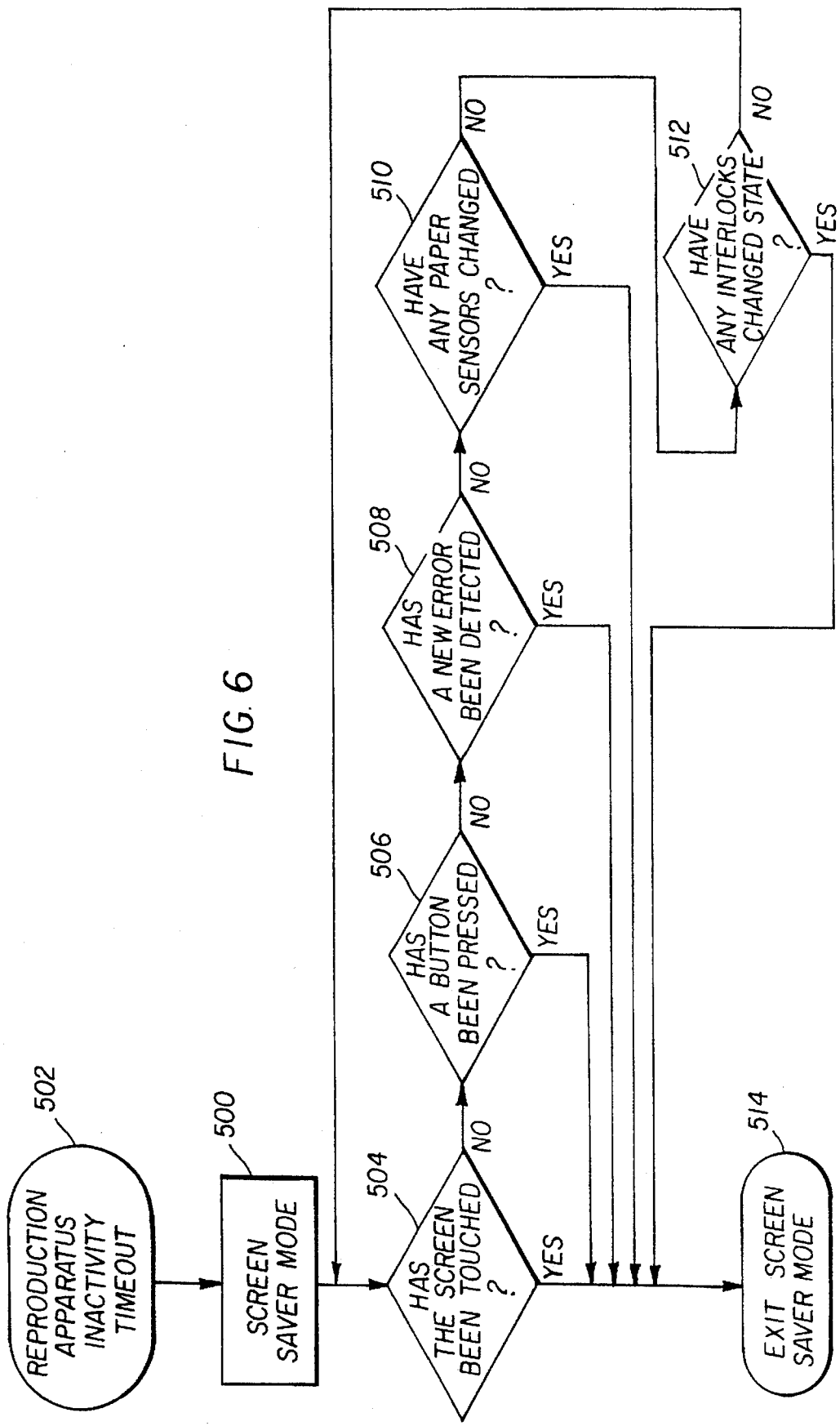

FIG. 6 is a flow diagram depicting the method of the present invention. The screen saver mode is activated (Box 500) after the predetermination reproduction apparatus inactivity timeout period (Bubble 502) has been determined. If the question asked in any of decision diamonds 504, 506, 508, 510, and 512 is answered yes, then the screen saver mode is exited (Bubble 514).

The invention has been described in detail herein with reference to the figures, however, it will be appreciated that variations and modifications are possible within the spirit and scope of the invention.

What is claimed is:

1. In a reproduction apparatus having a control system which includes a plurality of hard buttons and switches for providing operator input to and control of said reproduction apparatus, a display for displaying selectable features for a reproduction run and for displaying alphanumeric and graphical information, and a touchscreen overlaying at least a part of said display and having soft buttons and areas for providing operator input to said reproduction apparatus, the method of providing control only of said display comprising the steps of:

operating said display in a screen saver mode when said control system determines that there has been no reproduction apparatus activity for a preselected time; and terminating said screen saver mode of said display when said control system determines reproduction apparatus activity has been determined.

2. The method of claim 1 wherein said reproduction apparatus activity determined is detection of a new error in said reproduction apparatus.

3. The method of claim 1 wherein said reproduction apparatus activity determined is a document sensor or a copy sheet sensor has changed.

4. The method of claim 1 wherein said reproduction apparatus activity determined is an interlock state has changed.

* * * * *